United States Patent
Martin Hernandez

(10) Patent No.: US 7,699,266 B2
(45) Date of Patent: Apr. 20, 2010

(54) SEALING SYSTEM FOR THE GAP EXISTING BETWEEN THE FUSELAGE AND THE ELEVATOR OF AN AIRCRAFT WITH ORIENTABLE HORIZONTAL STABILIZER

(75) Inventor: Agustin Mariano Martin Hernandez, Getafe (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 256 days.

(21) Appl. No.: 11/790,453

(22) Filed: Apr. 25, 2007

(65) Prior Publication Data
US 2008/0169382 A1 Jul. 17, 2008

(30) Foreign Application Priority Data
May 16, 2006 (ES) ............... 200601257

(51) Int. Cl.
*B64C 5/00* (2006.01)
*B64C 1/26* (2006.01)
(52) U.S. Cl. ........................ 244/131; 244/89
(58) Field of Classification Search ............... 244/131, 244/132, 89, 90 A, 90 R, 216, 211–213
See application file for complete search history.

(56) References Cited

U.S. PATENT DOCUMENTS

| 2,378,885 | A | * | 6/1945 | Watter | 244/117 R |
| 2,981,504 | A | * | 4/1961 | Parker | 244/117 R |
| 3,063,659 | A | * | 11/1962 | Szerda | 244/46 |
| 3,499,622 | A | * | 3/1970 | Surcin et al. | 244/130 |
| 4,034,939 | A | * | 7/1977 | Ridley et al. | 244/87 |
| 4,471,925 | A | * | 9/1984 | Kunz | 244/130 |
| 5,096,142 | A | | 3/1992 | Rodriguez | |

(Continued)

FOREIGN PATENT DOCUMENTS

JP    2028999    2/1990

OTHER PUBLICATIONS

Spanish Search Report issued May 29, 2008 in the corresponding Spanish Application No. 200601257 (with English translation).

*Primary Examiner*—Tien Dinh
(74) *Attorney, Agent, or Firm*—Wenderoth, Lind & Ponack, L.L.P.

(57) ABSTRACT

A sealing system for a gap (2) existing between the fuselage (3) and the elevator (4) of a orientable horizontal stabilizer (5) of an aircraft, comprises a main body (1) formed by an upper surface (18) and a lower surface (19) and at least one longitudinal vertical element (22) arranged between the two surfaces (18,19) which grants rigidity to the main body (1), and a plurality of first elastic sealing profiles (9) between the first surface (11) of the main body (1) and the outer surface of the fuselage (3) and making contact with them, and a plurality of second elastic sealing profiles (13) between the second surface (12) of the main body (1) and the first end of the elevator (15) and making contact with them, in such a way that the sealing of the gap (2) takes place and an aerodynamic continuity is produced between the fuselage (3) and the elevator (4) when the elevator (4) is at rest in the plane of the orientable horizontal stabilizer (5) for any of the orientation positions of the orientable horizontal stabilizer (5).

18 Claims, 3 Drawing Sheets

U.S. PATENT DOCUMENTS

| | | |
|---|---|---|
| 5,749,546 A | 5/1998 | Blackner et al. |
| 5,794,893 A | 8/1998 | Diller et al. |
| 6,145,791 A * | 11/2000 | Diller et al. ................. 244/215 |
| 6,170,781 B1 * | 1/2001 | Sherrill et al. ............ 244/129.5 |
| 6,581,877 B2 * | 6/2003 | Pauly ......................... 244/131 |
| 6,655,635 B2 * | 12/2003 | Maury et al. ................. 244/131 |

* cited by examiner

SEALING SYSTEM FOR THE GAP EXISTING BETWEEN THE FUSELAGE AND THE ELEVATOR OF AN AIRCRAFT WITH ORIENTABLE HORIZONTAL STABILIZER

BACKGROUND OF THE INVENTION

This invention belongs to the technical field of sealing systems intended to cover gaps or grooves in outer surfaces of vehicles in the aeronautical sector, and more particularly to the field of sealing systems intended to cover gaps existing between the fuselage and the elevator of an aircraft with an orientable horizontal stabilizer.

In the large majority of aircraft there exists a gap or groove between the elevator of each horizontal stabilizer and the fuselage. This groove is necessary for permitting the movements made by the elevator in different maneuvers of the aircraft such as ascent or descent.

On the other hand, during cruise conditions, which represent the major part of the operating time of an aircraft, the elevator does not move, being at rest in the plane of the horizontal stabilizer.

During these cruise conditions, owing to the incidence of the airflow on the groove, certain loads are created which increase the aerodynamic resistance, occasioning various inefficiencies, among others an increase in fuel consumption.

So, in order to avoid this increase in aerodynamic resistance created by the airflow, it would be desirable to seal the gap existing between the elevator and the fuselage during cruise conditions in which the elevator remains at rest in the plane of the horizontal stabilizer. During maneuvers in which movements of the elevator take place, the groove varies in size and shape, but while those maneuvers are taking place this groove does not need to be sealed since the maneuvers account for a minimal operating time of the aircraft and the impact of the increase in aerodynamic resistance at these moments is negligible.

The complexity of the situation increases when the horizontal stabilizers in which the elevators are located are orientable, in other words, their position can be varied by inclining them in order to achieve stability by means of centering the forces acting on the aircraft, since for the correct movement of the stabilizers here exist some additional gaps between the elevators and the fuselage, these gaps being larger than the above and which therefore increase the aerodynamic resistance more.

So far, in the prior art, solutions have been known for sealing the gap existing between the fuselage and the elevator in aircraft with a fixed horizontal stabilizer, but not for sealing the gap in aircraft with an orientable horizontal stabilizer, the gap being even greater than in the previous case, which meant that the increase in the aerodynamic resistance owing to the gap and the inefficiencies caused by it, revealed in a higher fuel consumption and increased environmental impact, had to be accepted.

A system was therefore desirable which would solve the problems existing in the state of the art.

SUMMARY OF THE INVENTION

The aim of the present invention is to overcome the drawbacks of the state of the art previously described by means of a sealing system between the fuselage and the elevator of an aircraft with an orientable horizontal stabilizer.

The sealing system succeeds in covering the gap between the elevator and the fuselage during cruise conditions in which the elevator is at rest in the plane of the orientable horizontal stabilizer for any of the possible orientations of the orientable horizontal stabilizer, thereby reducing the aerodynamic resistance and as a result of that reducing the fuel consumption and environmental impact.

The sealing system forming the object of the invention comprises a main body with a substantially prismatic and elongated shape located in the gap existing between the elevator and the fuselage, being fixed to the horizontal stabilizer. The main body comprises an upper surface which forms a continuation of the upper surface of the elevator and a lower surface which forms a continuation of the lower surface of the elevator, the gap thus being covered above and below.

Between both surfaces there exists at least one longitudinal vertical element comprising a first surface facing the fuselage and a second surface facing the elevator. Between this first surface of the longitudinal vertical element and the outer surface of the fuselage there exists a plurality of first elastic sealing profiles making contact with both, and between this second longitudinal vertical element and the elevator there exists a plurality of second elastic sealing profiles making contact with both.

In this way, the sealing of the gap is carried out, with an aerodynamic continuity taking place between the fuselage and the elevator, thanks to the main body and the elastic sealing profiles, when the elevator is at rest positioned in the plane of the orientable horizontal stabilizer for any of the possible orientation positions of the horizontal stabilizer.

Likewise, the longitudinal vertical element provides firmness, rigidity and resistance for the main body. In the event that it is wished to carry out the sealing of large gaps, a wider main body will be needed, and for the embodiment of this main body more than one longitudinal vertical element is used, which will be arranged along the entire width of the main body.

In a particular embodiment of the invention, the main body includes at least one transverse vertical element between the upper surface and the lower surface in which fixing members are provided for fixing the main body to the horizontal stabilizer.

The main body can be created in different materials such as metal, plastic or composite materials including low density materials such as carbon fiber, depending on the mechanical properties it is wished to give to the sealing system according to the size of the aircraft, the size of the gap and the loads to bear. The main advantage of metallic materials is their low cost and ease of manufacture and maintenance as well as possessing high resistance, while plastics and composites display the advantage of less weight and absence of fatigue and corrosion effects.

Similarly, the main body can also be made of a single piece, or be formed from several pieces assembled together, this latter embodiment displaying the advantage of ease of manufacture and the possibility of producing sealing systems of widely varying shapes and sizes, by producing their constituent parts separately and then joining those parts together.

Regarding the elastic sealing profiles, these are the ones which guarantee the sealing of the gap and the complete continuity between the main body and the fuselage and the elevator. These sealing profiles can be created in different materials such as gums, rubbers and silicones, and in addition their outer surface includes a fabric surface with a low coefficient of friction, such as Teflon-based (i.e., polytetrafluoroethylene-base) fabrics, in order to facilitate the relative movement between the components separated by the seal and prevent deterioration due to rubbing and friction, providing an additional protection against various outside agents.

In certain embodiments of the sealing system, owing to the forces which are going to be applied to it, the sealing profiles can be reinforced in order to increase their resistance by means of internal or external reinforcements carried out with metal, plastics, fabrics or composites, which will be applied according to the needs of functionality.

The fixing of the first elastic sealing profiles, in other words, those making contact with the main body and the fuselage, is done to the main body. Also, in a preferred embodiment of the invention, the zone of the fuselage that is in contact with the seal is coated with a layer made of a friction-resistant material in order to prevent marks caused by rubbing of the sealing profiles due to movement of the sealing system.

On the other hand, the fixing of the second elastic sealing profiles, in other words, those making contact with the main body and the elevator, can be done either to the main body or to the elevator.

BRIEF DESCRIPTION OF THE DRAWINGS

In order to facilitate a better understanding of this specification and forming an integral part thereof, some drawings are attached in which, on a basis that is illustrative and not limiting, the object of the invention has been represented in some of its different embodiments.

DETAILED DESCRIPTION OF THE INVENTION

Figure 1:
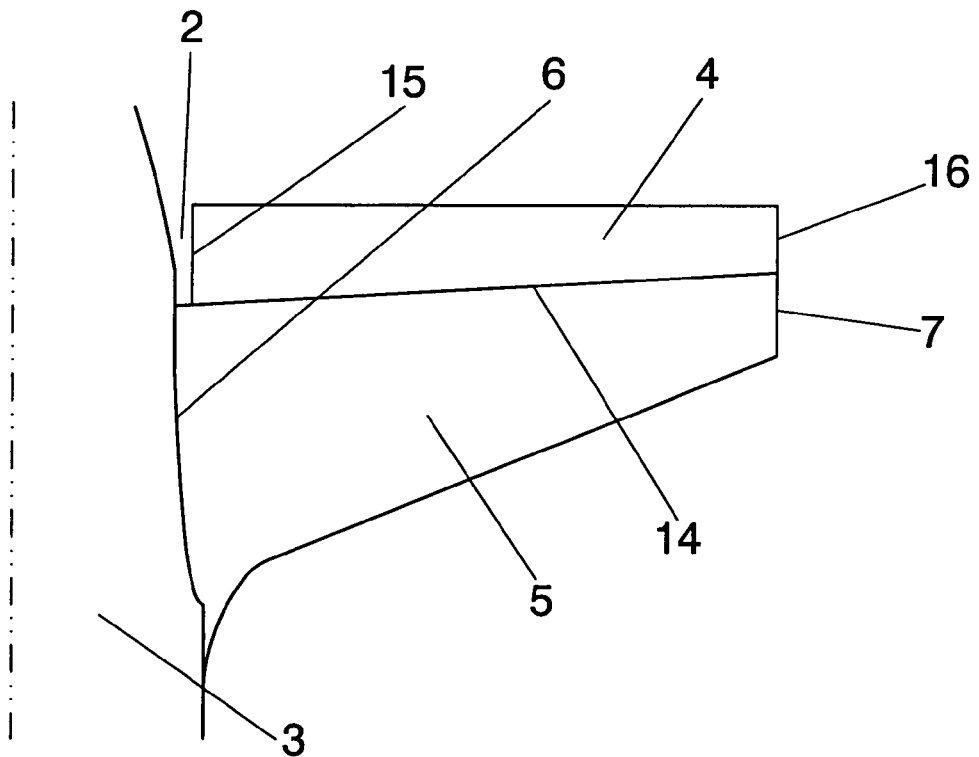
FIG. 1 is a general schematic view of the arrangement of the stabilizer, the elevator and the fuselage, and the gap existing between the elevator and the fuselage when sealing by means of the inventive system.
Figure 2:
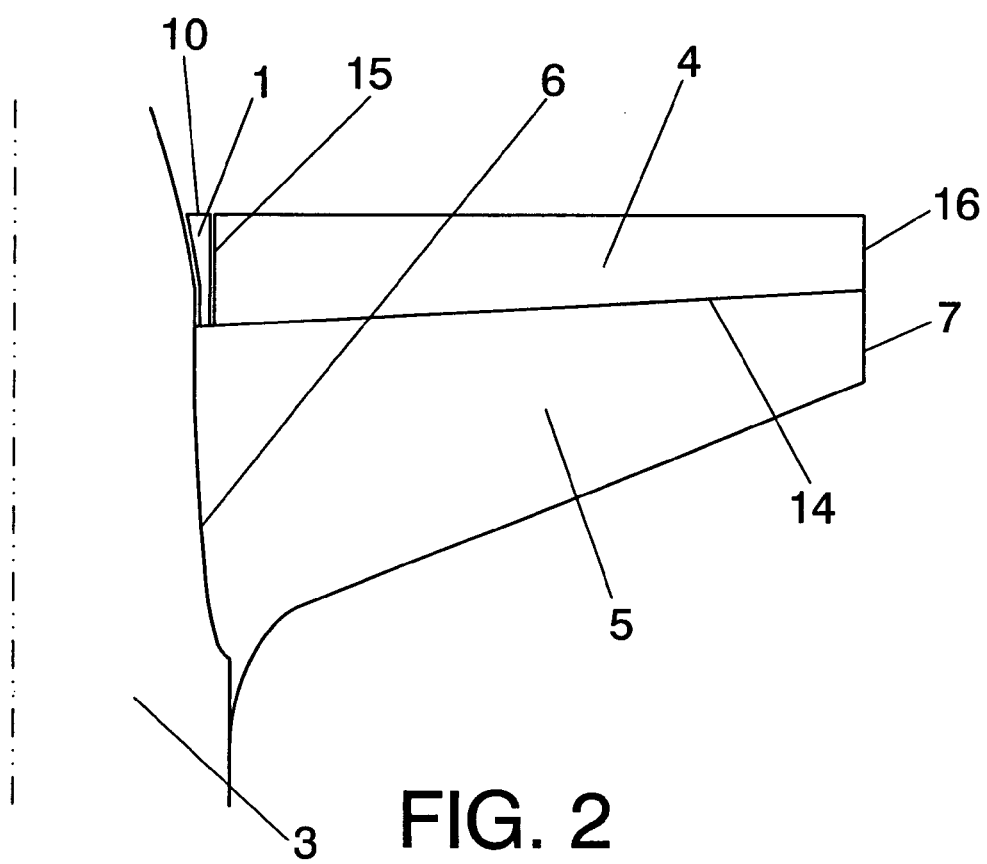
FIG. 2 is a schematic view of the general arrangement of the elements of FIG. 1, though with the main body of the sealing system introduced into the gap.

FIGS. 1 and 2 show a general view of the application environment of the sealing system of the invention, where the rear zone of a fuselage 3 of an aircraft can be appreciated in which an or orientable horizontal stabilizer 5 is provided in which is located an elevator 4. The orientable horizontal stabilizer 5 comprises a first end 6 joined to the fuselage 3 and a second free end 7, and the elevator 4 comprises a first end 15 in proximity to the fuselage 3 and a second free end 16. FIG. 1 shows a gap 2 existing between the fuselage 3 and the elevator 4 in order to permit the correct movement both of said elevator 4 and of the orientable horizontal stabilizer 5. The gap 2 gives rise to an aerodynamic resistance owing to the passage of the airflow through it, which has the consequence of a greater need for power for the correct functioning of the aircraft, and therefore greater fuel consumption, with the consequent impact on the cost and a greater environmental impact. The sealing system of the present invention has the aim of solving this problem in a way that is simple and efficient by means of complete sealing of the gap 2 and at the same time permitting correct movement both of the elevator 4 and of the orientable horizontal stabilizer 5.

The sealing system comprises a main body 1 of substantially prismatic and elongated form, having a contour 10 and in particular displaying certain dimensions and shapes similar to those of the gap 2 existing between the fuselage 3 and the elevator 4 which it is sought to seal. The main body 1 is introduced into the gap 2 and is fixed to the orientable horizontal stabilizer 5 via some conventional fixing members 8 such as screwed or riveted unions.

The main body 1 comprises an upper surface 18 and a lower surface 19. The upper surface 18 constitutes a continuation of the upper surface of the elevator 20 and the lower surface 19 constitutes a continuation of the lower surface of the elevator 21.

Between the upper 18 and lower 19 surfaces, the main body 1 comprises at least one longitudinal vertical element 22 which runs the entire length of the main body 1. This longitudinal vertical element 22 confers rigidity and resistance to the main body. If it is necessary to carry out the sealing of large gaps 2 requiring wider surfaces 18, 19, various longitudinal vertical elements 22 could be used between both surfaces 18, 19, separated along the entire width of those surfaces 18, 19. The longitudinal vertical element 22 consists of a first surface 11 facing the outer surface of the fuselage 3, and a second surface 12 facing the first end of the elevator 15 and in proximity to that first end of the elevator 15.

Likewise, according to a preferred embodiment for wide main bodies 1, the main body furthermore includes between the upper surface 18 and the lower surface 19 at least one transverse vertical element 23 perpendicular to the longitudinal vertical element 22. The transverse vertical element 23 grants rigidity and resistance to the array, and the fixing members 8 can be arranged therein.

In a particular embodiment of the main body 1, this is produced in a single piece, and in another particular embodiment the main piece 1 is formed from a plurality of assembled pieces. This latter embodiment provides the advantage of simplicity of manufacture and the possibility of producing sealing systems with widely varying shapes and sizes, producing the parts it comprises separately and then joining those parts together.

Depending on the application and function of the main body 1, this can be produced using different materials. For large aircraft, light alloys made of metallic materials can be used, preferably those of aluminium which, in addition to optimum mechanical properties, also provide the advantages of low cost and great simplicity of manufacture and maintenance. For medium or small size aircraft, plastic materials can be used which have suitable mechanical properties and display the advantages of great versatility in manufacture and the absence of corrosion and fatigue phenomena which appear in metallic materials. Alternatively, and for aircraft of any size, composite materials can be used such as plastics reinforced with fibre-glass or carbon fibre, which provide the advantages of less weight and absence of corrosion and fatigue.

Figure 4:
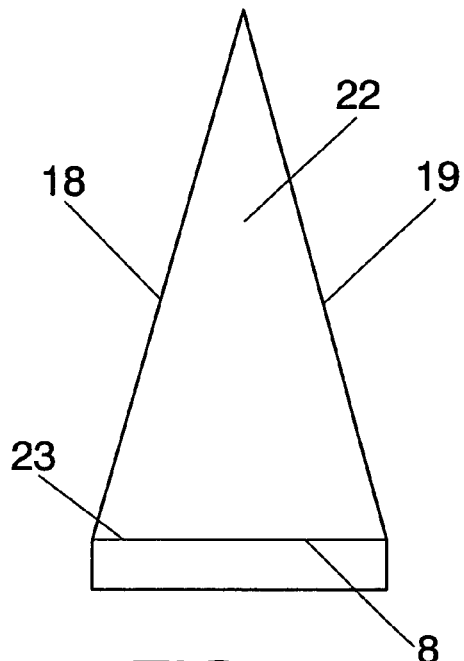
FIG. 4 is a schematic view in cross-section along the line BB' of FIG. 3.
Figure 5:
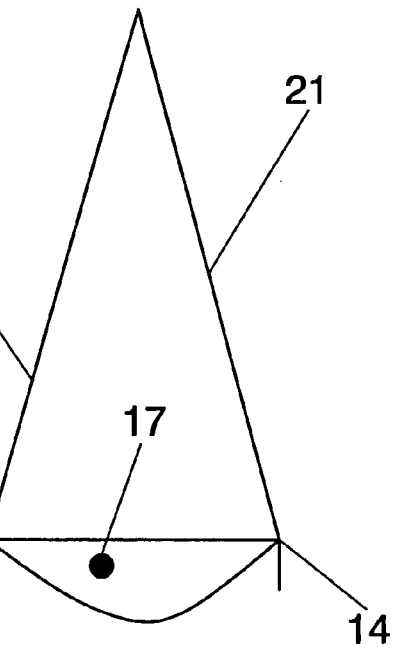
FIG. 5 is a schematic view in cross-section along the line CC' of FIG. 3.

FIGS. 4 and 5 show a schematic view in cross-section of the sealing system, where the shape adopted by the upper 18 and lower 19 surfaces of the main body can be seen, which is similar to that displayed by the surfaces 20 and 21 of the elevator, in order to achieve continuity between them.

In addition to the main body, the sealing system also comprises a plurality of elastic sealing profiles 9 arranged between the first surface 11 of the main body 1 and the outer surface of the fuselage 3, and a plurality of second elastic sealing profiles 13 arranged between the second surface 12 of the main body 1 and the first end of the elevator 15. The first elastic sealing profiles 9 make contact with the first surface 11 of the main body 1 and the outer surface of the fuselage 3, and the second elastic sealing profiles 13 make contact with the second surface 12 of the main body 1 and the first end of the elevator 15, thereby, and in conjunction with the upper surface of the main body 18 and the lower surface of the main body 19, carrying out the sealing of the gap 2, and with an aerodynamic continuity being produced between the fuselage 3 and the elevator 4 when the elevator is at rest, positioned in the plane of the orientable horizontal stabilizer 5 for any of the possible positions of orientation of the orientable horizontal stabilizer 5. For any other position of the elevator 4 with respect to the orientable horizontal stabilizer 5, the sealing of the gap 2 will not be carried out completely but this will not have an excessive influence on the aerodynamic resistance since these inclined positions of the elevator 4 with respect to the orientable horizontal stabilizer 5 are produced during the take-off or landing maneuvers and changes of altitude, and these imply a minimum length of time compared to the total flying time.

Figure 3:
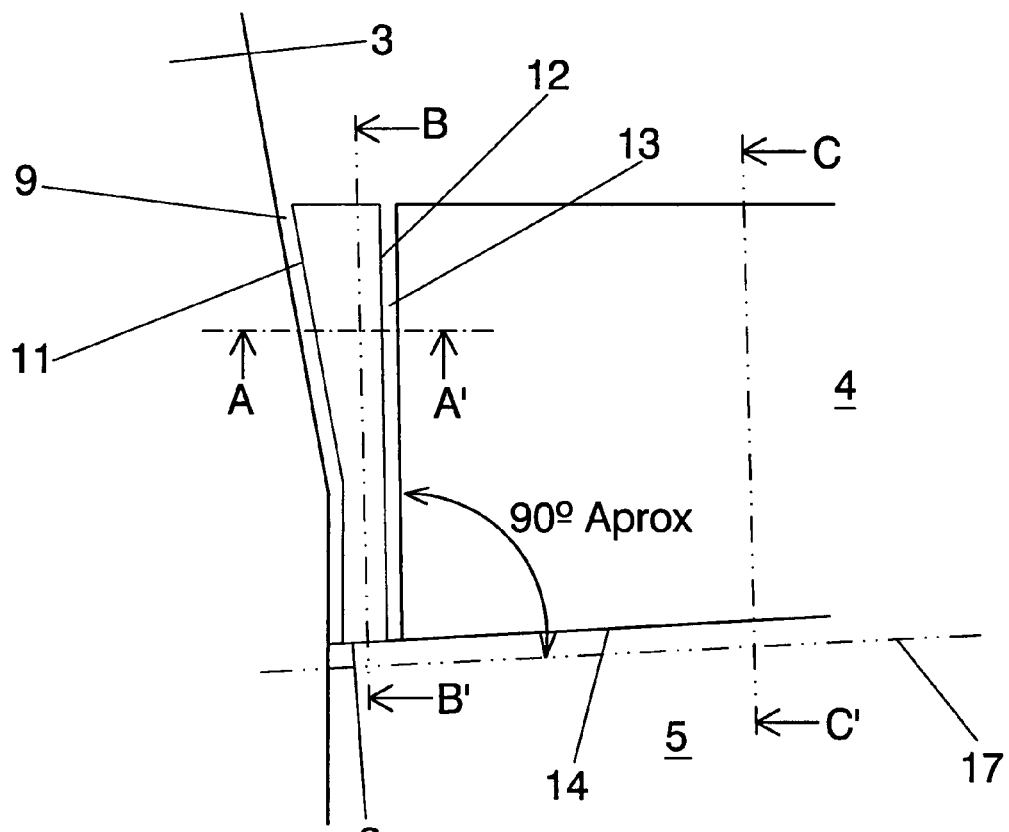
FIG. 3 is an enlarged schematic view of an embodiment of the inventive sealing system provided in the gap.

FIG. 3 shows an enlarged schematic view of the elements making up the sealing system and their arrangement, in an embodiment of the invention in which the assembly of main body 1 and elastic sealing profiles 9, 13 are arranged in the gap 2 in such a way that the second surface 12 of the main body 1 is arranged in a manner perpendicular to the axis of rotation 17 of the elevator 4, such that the second surface of the main body is parallel to the first end of the elevator 15. The advantages of this embodiment are ease of design and of manufacture and installation with which complete sealing of the gap 2 and continuity between the elevator 4 and the fuselage 3 are achieved, permitting the necessary movements both of the elevator 4 and of the orientable horizontal stabilizer 5.

In different embodiments of the first and second elastic sealing profiles 18, 19, these are produced in different elastic materials such as gum, rubber and silicone, with silicone being preferably used owing to its resistant behaviour towards outside agents, its high flexibility and its durability.

In a preferred embodiment of the invention, a layer of low friction fabric is fixed on the outer surface of each of the first elastic sealing profiles 9 and on the outer surface of each of the second elastic sealing profiles 13. This layer of low friction fabric has the advantage of avoiding wear of the surfaces of the sealing profiles 9, 13 when there exists sliding between them and the components that they make contact with owing to the relative movement between the components making contact with those sealing profiles 9, 13.

In a preferred embodiment of the layer of low friction fabric, the layer is produced using fabrics based on Teflon (i.e., polytetrafluoroethylene).

With the aim of providing greater resistance so that the different forces applied to them can be withstood, both the first elastic sealing profiles 9 and the second elastic sealing profiles 13 can be reinforced by means of different means of reinforcement. In one embodiment, these means of reinforcement consist of a reinforcement internal to the sealing profiles 9, 13, combined within the thickness of them, and in an alternative embodiment, these means of reinforcement consist of a reinforcement external to the sealing profiles 9, 13. The internal reinforcements can be made from various materials depending on the application, such as fabric, plastic materials, metallic materials, and composites which include low density materials. Also, the external reinforcements can be made from plastic materials, metallic materials, and composites which include low density materials.

In a preferred embodiment of the invention elastic sealing profiles 9, 13, are used made of silicone coated in a low friction fabric produced from Teflon and reinforced by internal reinforcement layers of fabric.

The first elastic sealing profiles 9 have to be fixed to the first surface 11 of the main body and slide on the outer surface of the fuselage 3 since the position of the main body 1 will move owing to the movement of the orientable horizontal stabilizer 5 and its position will be variable with regard to the fuselage 3, and, therefore, if they are fixed to said fuselage 3 for a given position of the orientable horizontal stabilizer 5, for the rest of the positions the sealing of the gap 2 will be incorrect. On the other hand, in terms of the second elastic sealing profiles 13, both their fixing to the elevator 15 sliding with respect to the second surface 12 of the main body 1, and their fixing to the second surface 12 of the main body 1 sliding with regard to the first end of the elevator 15 is optimum, given that in this case the first end of the elevator 15 and the second surface 12 of the main body 1 remain aligned in the same position during most of the flying time, apart from during instants of maneuvers in which movements of the elevator 4 take place.

The elastic sealing profiles 9, 13 are fixed to the surfaces by fixing members that are conventional in themselves such as fastening by means of threaded unions or rivets, or via additional housings and fittings.

Figure 6:
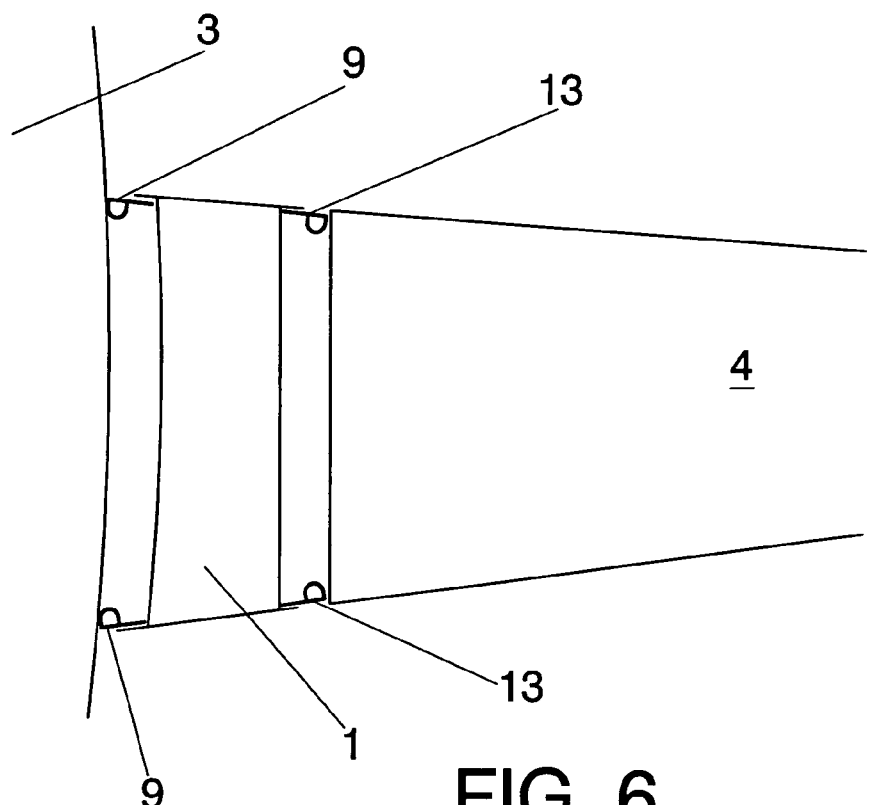
FIG. 6 is a schematic view in cross-section along the line AA' of FIG. 3 according to an embodiment of the elastic sealing profiles.
Figure 7:
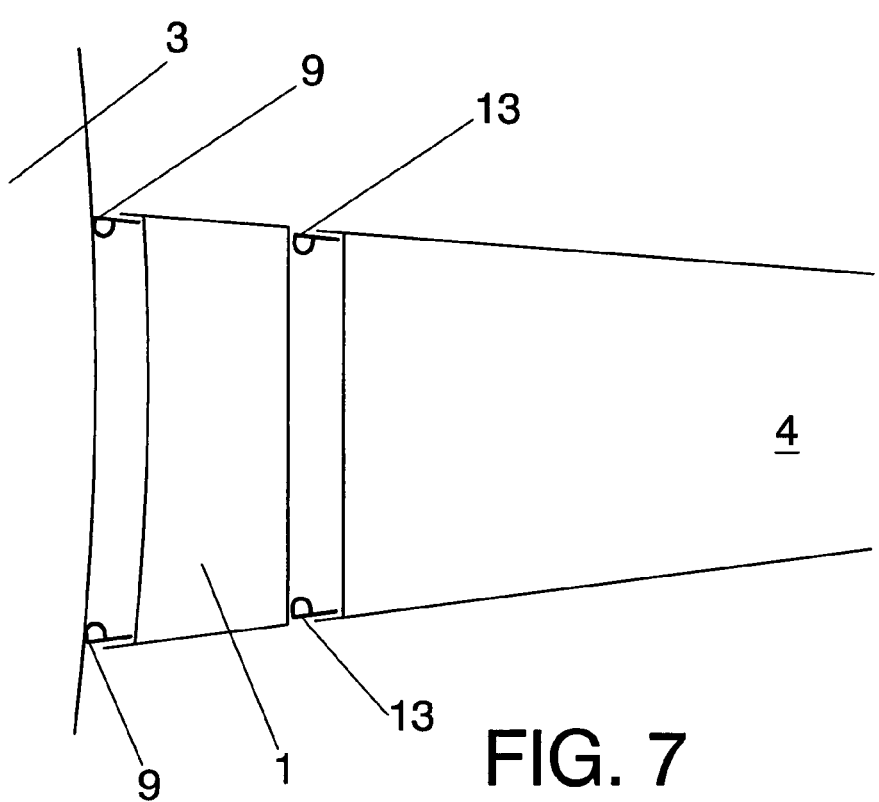
FIG. 7 is a schematic view in cross-section along the line AA' of FIG. 3 according to an alternative embodiment of the elastic sealing profiles.

FIG. 6 shows a particular embodiment of the invention in which the first elastic sealing profiles 9 are fixed to the first surface 11 of the main body 1 and a sliding of them takes place on the outer surface of the fuselage 3, and the second elastic sealing profiles 13 are fixed to the second surface 12 of the main body 1 and a sliding of them takes place on the first end of the elevator 15. FIG. 7 shows a particular embodiment of the invention in which, as with the above embodiment, the first elastic sealing profiles 9 are fixed to the first surface 11 of the main body 1, but in this case the second elastic sealing profiles 13 are fixed to the first end of the elevator 15 and sliding of them is produced on the second surface 12 of the main body 1.

Both in the embodiment shown in FIG. 6 and, preferably, in the embodiment shown in FIG. 7, the zone of the fuselage 3 in contact with the first elastic sealing profiles 9 is coated with a material resistant to friction in order to avoid possible wear produced on the fuselage owing to friction between said fuselage and the first elastic sealing profiles 9 originated by the relative displacements of the latter.

The invention claimed is:

1. A sealing system for a gap existing between a fuselage and an elevator of an orientable horizontal stabilizer of an aircraft, said orientable horizontal stabilizer (5) comprising a first end (6) joined to the fuselage (3) and a second free end (7), and the elevator (4) comprising a first end (15) in proximity to the fuselage (3) and a second free end (16), wherein said sealing system comprises a main body (1) of substantially prismatic and elongated form arranged in the gap (2) existing between the fuselage (3) and the first end of the elevator (15) of each of the orientable horizontal stabilizer (5), said main body (1) being fixed to the orientable horizontal stabilizer (5) by fixing members (8), said main body (1) comprising an upper surface (18) which constitutes a continuation of an upper surface of the elevator (20), and a lower surface (19) which constitutes a continuation of a lower upper surface of the elevator (21);

at least one longitudinal vertical element (22) arranged between the upper surface (18) and the lower surface (19) and which runs the entire length of said main body (1), said longitudinal vertical element (22) including a first surface (11) facing the outer surface of the fuselage (3), and in proximity to said outer surface of the fuselage (3), and a second surface (12) facing the first end of the elevator (15) and in proximity to said first end of the elevator (15);

a plurality of first elastic sealing profiles (9) arranged between the first surface (11) of the main body (1) and the outer surface of the fuselage (3), and a plurality of second elastic sealing profiles (13) arranged between the second surface (12) of the main body (1) and the first end of the elevator (15), in such a way that the first elastic sealing profiles (9) make contact with the first surface (11) of the main body (1) and the outer surface of the fuselage (3), and the second elastic sealing profiles (13) make contact with the second surface (12) of the main body (1) and the first end of the elevator (15), thereby carrying out the sealing of said gap (2) and producing an aerodynamic continuity between the fuselage (3) and the elevator (4) by means of said sealing system, when said elevator (4) is at rest, positioned in the plane of the orientable horizontal stabilizer (5) for any of the possible positions of orientation of said orientable horizontal stabilizer (5).

2. The sealing system for the gap existing between the fuselage and the elevator of the orientable horizontal stabilizer of an aircraft, according to claim 1, wherein the main body (1) includes between the upper surface (18) and the lower surface (19) at least one transverse vertical element (23) perpendicular to the longitudinal vertical element (22).

3. The sealing system for the gap existing between the fuselage and the elevator of the orientable horizontal stabilizer of an aircraft, according to claim 2, wherein the fixing members (8) are arranged in the transverse vertical element (23).

4. The sealing system for the gap existing between the fuselage and the elevator of the orientable horizontal stabilizer of an aircraft, according to claim 1, wherein the main body (1) is a single piece.

5. The sealing system for the gap existing between the fuselage and the elevator of the orientable horizontal stabilizer of an aircraft, according to claim 1, wherein the main body (1) is formed from a plurality of assembled pieces.

6. The sealing system for the gap existing between the fuselage and the elevator of the orientable horizontal stabilizer of an aircraft, according to claim 1, wherein the main body (1) is made from materials selected from among metal, plastic, composites with low density elements and a combination thereof.

7. The sealing system for the gap existing between the fuselage and the elevator of the orientable horizontal stabilizer of an aircraft, according to claim 1, wherein the first elastic sealing profiles (9) and the second elastic sealing profiles (13) are made from materials selected from between gum, rubber and silicone.

8. The sealing system for the gap existing between the fuselage and the elevator of the orientable horizontal stabilizer of an aircraft, according to claim 1, further comprising a layer of low friction fabric fixed on the outer surface of each of the first elastic sealing profiles (9) and on the outer surface of each of the second elastic sealing profiles (13).

9. The sealing system for the gap existing between the fuselage and the elevator of the orientable horizontal stabilizer of an aircraft, according to claim 1, wherein the layer of low friction fabric is produced from fabrics based on polytetrafluoroethylene.

10. The sealing system for the gap existing between the fuselage and the elevator of the orientable horizontal stabilizer of an aircraft, according to claim 1, wherein the first elastic sealing profiles (9) comprise at least one internal reinforcement combined within the thickness of said first elastic sealing profiles (9) and made from materials selected from among layers of fabric, plastic materials, metallic materials, composites which include low density elements and a combination thereof.

11. The sealing system for the gap existing between the fuselage and the elevator of the orientable horizontal stabilizer of an aircraft, according to claim 1, wherein the first elastic sealing profiles (9) comprise at least one external reinforcement made from materials selected from among layers of fabric, plastic materials, metallic materials, composites which include low density elements and a combination thereof.

12. The sealing system for the gap existing between the fuselage and the elevator of the orientable horizontal stabilizer of an aircraft, according to claim 1, wherein the second elastic sealing profiles (13) comprise at least one internal reinforcement combined within the thickness of said second elastic sealing profiles (13) and made from materials selected from among layers of fabric, plastic materials, metallic materials, composites which include low density elements and a combination thereof.

13. The sealing system for the gap existing between the fuselage and the elevator of the orientable horizontal stabilizer of an aircraft, according to claim 1, wherein the second elastic sealing profiles (13) comprise at least one external reinforcement made from materials selected from among layers of fabric, plastic materials, metallic materials, composites which include low density elements and a combination thereof.

14. The sealing system for the gap existing between the fuselage and the elevator of the orientable horizontal stabilizer of an aircraft, according to claim 1, wherein the first elastic sealing profiles (9) are fixed to the first surface (11) of the main body (1).

15. The sealing system for the gap existing between the fuselage and the elevator of the orientable horizontal stabilizer of an aircraft, according to claim 14, wherein the zone of the fuselage (3) in contact with the first elastic sealing profiles (9) is coated with a layer made from a friction resistant material.

16. The sealing system for the gap existing between the fuselage and the elevator of the orientable horizontal stabilizer of an aircraft, according to claim 1, wherein the second elastic sealing profiles (13) are fixed to the first end of the elevator (15).

17. The sealing system for the gap existing between the fuselage and the elevator of the orientable horizontal stabilizer of an aircraft, according to claim 1, wherein the second elastic sealing profiles (13) are fixed to the second surface (12) of the main body (1).

18. The sealing system for the gap existing between the fuselage and the elevator of the orientable horizontal stabilizer of an aircraft, according to claim 1, wherein the second surface (12) of the main body (1) is arranged in a manner perpendicular to the axis of rotation (17) of the elevator (4), in such a way that said second surface (12) of the main body (1) is parallel to the first end of the elevator (15).

* * * * *